(No Model.)
E. FLANNIGAIN.
ANTIFRICTION BEARING.
No. 598,414. Patented Feb. 1, 1898.
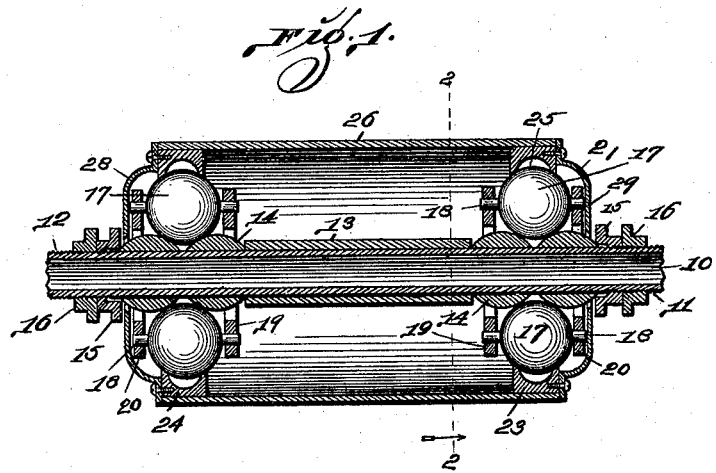
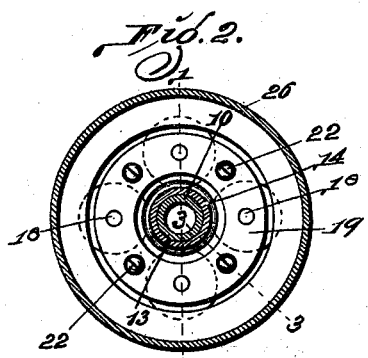
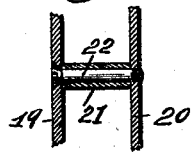
Attest:
W. P. Smith
A. J. McCauley
Inventor:
Edward Flannigain
By Higdon, Longan & Higdon
Attys.
THE NORRIS PETERS CO., PHOTO-LITHO., WASHINGTON, D. C.

UNITED STATES PATENT OFFICE.

EDWARD FLANNIGAIN, OF ST. LOUIS, MISSOURI, ASSIGNOR OF ONE-HALF TO OLIVER G. SHANDS, OF SAME PLACE.

ANTIFRICTION-BEARING.

SPECIFICATION forming part of Letters Patent No. 598,414, dated February 1, 1898.

Application filed February 1, 1897. Serial No. 621,519. (No model.)

*To all whom it may concern:*

Be it known that I, EDWARD FLANNIGAIN, of the city of St. Louis, State of Missouri, have invented certain new and useful Improvements in Antifriction-Bearings, of which the following is a full, clear, and exact description, reference being had to the accompanying drawings, forming a part hereof.

My invention relates to antifriction-bearings; and it consists in the novel construction, combination, and arrangement of parts hereinafter shown, described, and claimed.

Figure 1 is a sectional view of an antifriction-bearing constructed in accordance with the principles of my invention, said view being taken longitudinally of the axis of the bearing and approximately on the line 1 1 of Fig. 2. Fig. 2 is a transverse sectional view of the bearing shown in Fig. 1 and taken approximately on the line 2 2 of Fig. 1 and looking in the direction indicated by the arrow. Fig. 3 is an enlarged detail sectional view taken approximately on the line 3 3 of Fig. 2. Fig. 4 is a view in elevation showing a modified form of roller.

In the construction of an antifriction-bearing in accordance with the principles of my invention and as shown in Figs. 1 and 2 the shaft 10 forms the axle, around which the bearing operates, and said shaft may be either tubular or solid, as desired, and the screw-threads 11 and 12 are formed upon the shaft at the ends of the bearing. The tubular section or collar 13 is movably mounted upon the shaft 10 in position to be approximately at the center of the bearing. The rings 14 are movably mounted upon the shaft 10, a pair of said rings at each end of the collar 13. The peripheries of the rings 14 are convex in cross-section, and I prefer to make the convexity of said rings a segment of a circle, which circle is equal to the diameter of the rings. In other words, the rings 14 appear like spherical bodies, having holes bored through said centers to receive the shaft 10. The nuts 15 are placed upon the screw-threaded portions 11 and 12 of the shaft 10, with their inner faces in position to engage the outer faces of the outer ones of the rings 14, and the jam-nuts 16 are placed upon said shaft against the outer faces of said nuts 15.

The location of the rings 14 and of the collar 13 may be adjusted upon the shaft 10 by the manipulation of the nuts 15 and 16.

The rollers 17 have the spindles 18 formed integral with and projecting from opposite sides and in alinement with each other, and the peripheries of said rollers are convex in cross-section—that is, in lines parallel with their axes.

The rings 19 and 20 have openings in their centers large enough to allow the rings 14 to pass freely through said centers, and said rings have bearings in which the spindles 18 are loosely mounted. The collars 21 (shown in Fig. 3) are placed between the rings 19 and 20, and the screws 22 are inserted through the rings 19, through the collars 21, and are screw-seated in the rings 20, thus holding said rings 19 and 20 the desired distance apart and in alinement with each other. The rings 19 and 20, carrying the rollers 17, as described, are placed in position between the rings 14 and before said rings are brought together by the manipulation of the nuts 15 and 16.

The rings 23 and 24 each have an annular groove 25 formed in their inner face, and said rings are placed in position with the rollers 17 operating in said annular grooves. Then the nuts 15 and 16 are manipulated to bring the rings 14 toward each other, thus pressing the rollers 17 outwardly into said grooves 25. The bearings in the rings 19 and 20, in which the spindles 18 operate, hold said spindles loosely enough to allow of the adjustment first described. The rings 23 and 24 are inserted in the ends of the tubular casing 26 and fit closely within said casing.

The housing-plates 27 and 28 have openings in their centers, through which the shaft 10 passes, and the portions 29 of said housing-plates, which portions surround said openings, cover the outer ends of the spindles 18, and said plates are held in position by means of the screws 30, which are inserted through said plates and screw-seated in the rings 23 and 24, thus closing the ends of the casing 26 and forming a complete housing for the bearing.

It is obvious that any lost motion caused by wearing of the parts or otherwise may be taken up by manipulating the nuts 15 and 16 upon the shaft 10 and that the position of the bearing upon said shaft may also be changed by the manipulation of said nuts.

The rollers 39 (shown in Fig. 4) are elliptical or elongated and may be substituted for the rollers 17, the only difference being that the peripheries of the rollers 39 are less convex in cross-section than the peripheries of the rollers 17.

I claim—

In a ball-bearing, the combination with a suitable shaft having screw-threaded ends, of a collar slidingly mounted and centrally located upon said shaft, pairs of rings slidingly mounted upon said shaft at each end of said collar, the peripheries of said rings being convex in cross-section as required to form annular grooves around said shaft between said rings, rollers mounted to operate in said grooves, the peripheries of said rollers being convex in cross-section, spindles formed integral with and projecting from the ends of said rollers, rings mounted in parallel positions upon opposite sides of said rollers and with the spindles of said rollers operating in bearings in said rings, and said rings being secured rigidly together and free to travel around said shaft, rings having annular grooves in their inner faces mounted in position to surround said rollers and have said rollers operate in said internal annular grooves, there being one of said rings for each set of said rollers, a casing connecting the last-mentioned rings, and nuts screw-seated upon the ends of said shaft as required to take up the lost motion in the bearing and to adjust the bearing longitudinally of the shaft, substantially as specified.

In testimony whereof I affix my signature in presence of two witnesses.

EDWARD FLANNIGAIN.

Witnesses:
 EDWARD E. LONGAN,
 MAUD GRIFFIN.